No. 626,496. Patented June 6, 1899.
R. LUNDELL.
ELECTRIC MOTOR OR DYNAMO ELECTRIC MACHINE.
(Application filed Jan. 18, 1899.)
(No Model.) 2 Sheets—Sheet 1.
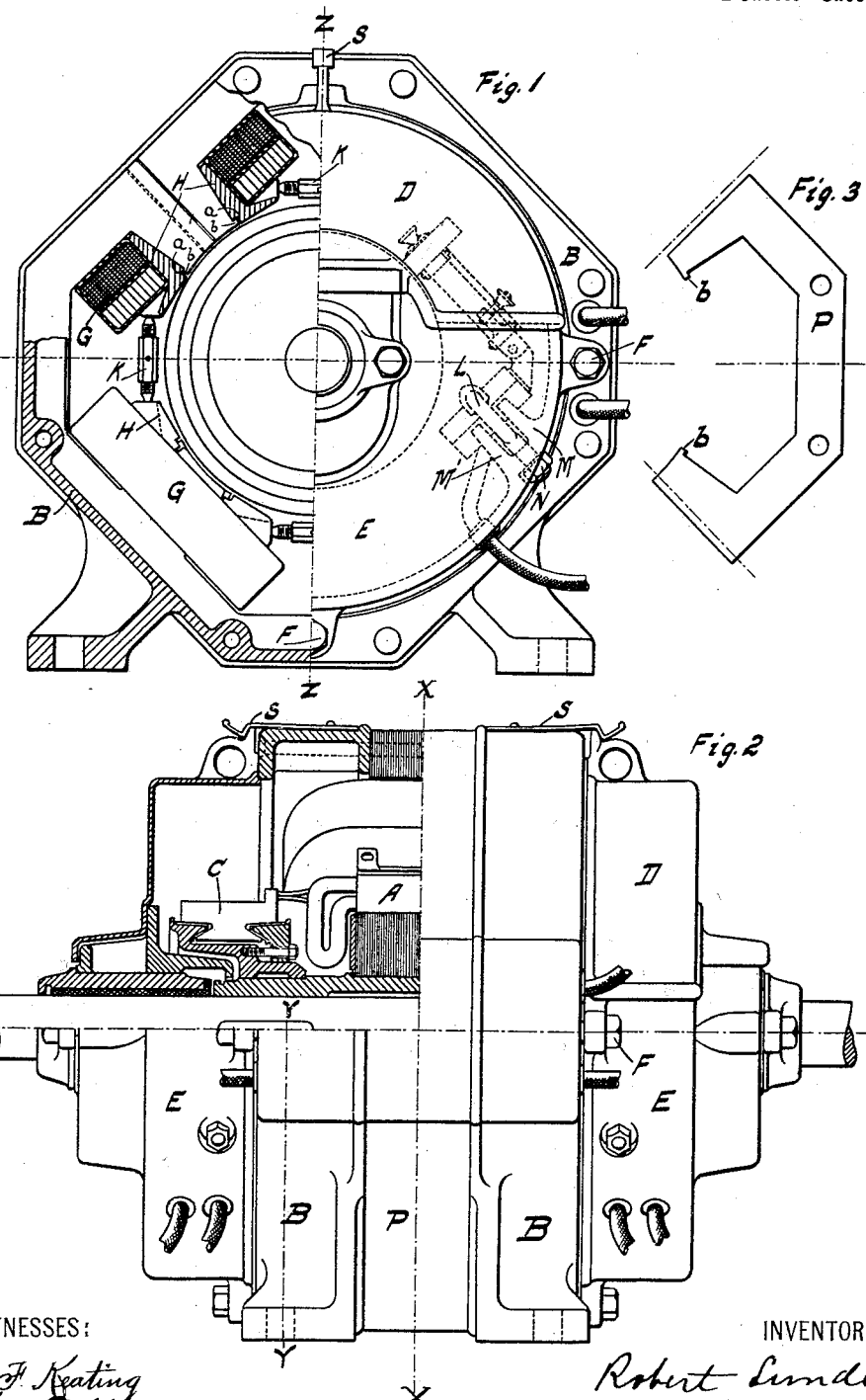
WITNESSES:
M. F. Keating
H. J. Pohlmann
INVENTOR
Robert Lundell
BY
Charles J. Kintner
ATTORNEY No. 626,496. Patented June 6, 1899.
R. LUNDELL.
ELECTRIC MOTOR OR DYNAMO ELECTRIC MACHINE.
(Application filed Jan. 18, 1899.)
(No Model.) 2 Sheets—Sheet 2.
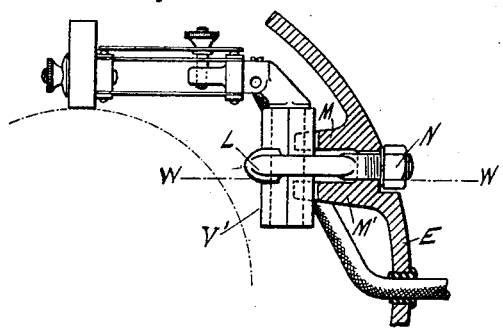
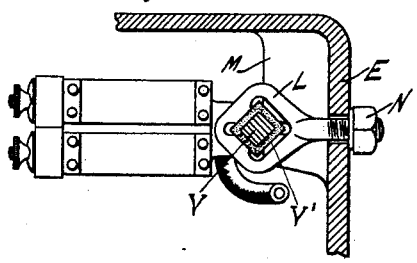
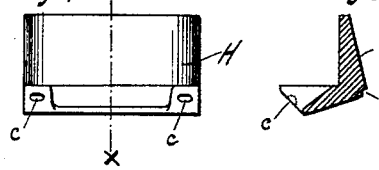
WITNESSES:
M. F. Keating
H. J. Bohlmann.
INVENTOR
Robert Lundell
BY
Charles J. Kintner
ATTORNEY

UNITED STATES PATENT OFFICE.

ROBERT LUNDELL, OF NEW YORK, N. Y.

ELECTRIC MOTOR OR DYNAMO-ELECTRIC MACHINE.

SPECIFICATION forming part of Letters Patent No. 626,496, dated June 6, 1899.

Application filed January 18, 1899. Serial No. 702,521. (No model.)

*To all whom it may concern:*

Be it known that I, ROBERT LUNDELL, a citizen of the United States, residing at New York, in the borough of Manhattan and State of New York, have made a new and useful Invention in Electric Motors and Methods of Regulating the Same, of which the following is a specification.

My invention relates particularly to improvements in electric motors or dynamo-electric machines having laminated field-magnets; and its objects are, first, to provide an electric motor or dynamo-electric machine with simple and efficient means for holding the field-magnet coils thereof in position and also for causing the magnetic flux to gradually diminish toward the pole-corners; second, to provide an electric motor or dynamo-electric machine with a brush-holding device which securely holds the brushes and freely admits of adjustment of the same and in such manner that the supporting-shank thereof may always be adjusted in a plane parallel with the diameter of commutation on the commutators, and, third, to provide an electric motor or dynamo-electric machine with especial details of construction hereinafter referred to, but particularly pointed out in the several claims at the end of the specification.

For a clear understanding of the invention reference is made to the accompanying drawings, in which—

Figure 1 is an end elevational view of the motor, partly in section, the upper left-hand section being taken on the center line X X and the lower on line Y Y of Fig. 2. Fig. 2 is a side elevational view of the motor with its upper left-hand corner shown in section, the same being taken on center line Z Z of Fig. 1. Fig. 3 shows in detail, in elevation, one piece of the soft sheet-iron field-punchings, the entire field-magnet being built up of like field-punchings for the purpose of obtaining the highest possible magnetic permeability. Fig. 4 is a side view of one of the pole-pieces and coil-holders in detail; and Fig. 5 is a sectional view of the same holder, taken on the center line $x$ $x$ of Fig. 4. Figs. 6 and 7 are detail views of the brush-holder, showing the novel manner in which the same is held in position.

Referring again to Figs. 1, 2, &c., it will be seen that the motor is of four-pole type and with both ends alike. The armature A is furnished with two windings and two commutators C, absolutely alike, one commutator only being shown. The field-magnet frame proper consists of a number of sectional sheet-iron punchings P, placed end to end with their internal projections surrounded by the field-coils and all permanently held or secured together between two end brackets B B, so as to constitute a laminated body portion of the motor, substantially as shown in Fig. 1 of the drawings. Said end brackets are of strong construction and are furnished with feet and journal-bearings, as the special application may require. They have each a large circular opening, (concentric with the armature,) in which the journal-bearing brackets E E and doors D D are fitted, the journal-bearing brackets being secured to the end brackets B B by bolts F F F and the doors being held by spring-catches S S S.

The field-coils G G are secured in their positions by the polar extensions H H, which are wedge-shaped and furnished with grooves or catches $a$ $a$ at their lower ends, engaging equivalent catches $b$ $b$ upon the field-punchings. They are further secured in position by right and left hand screw-jacks K K, two for each set of polar extensions, which jacks rest in oblong holes $c$ $c$ in the faces of the polar extensions (see Figs. 4 and 5) and are locked in position by wires going through their center portions. The field-coils may be wound a trifle small, so that the wedge-shaped polar extensions may hug them tightly after they are forced in position. These polar extensions perform another important function. They are made from such material (preferably cast-iron) that their magnetic permeability is only about one-half of that of the pole-center or field-magnet proper, whereby they cause the magnetic flux to gradually diminish toward the pole-corners, even though the armature cross-magnetizing force would have a tendency to abnormally increase the strength of one of the pole-corners.

Figs. 6 and 7 show the brush-holder in detail. Two of these holders are used for each commutator and are symmetrically arranged on each side of the center line Z Z, (see Fig. 1,) one being shown in dotted lines on the right-hand side. The construction of this brush-holder is similar to the one shown and described by me in a prior United States patent, No. 608,135; but a novel clamp for holding the same in position constitutes a part of the present improvements. This novel clamp consists of an eyebolt L, which passes between two ribs M M' of the casting and which is secured in position by the nut N. The shank V of the brush-holder, which is clamped between said eyebolt and ribs, is square in section and is surrounded by an insulating vulcabeston sleeve V', also square in section, so that there is no danger of the brush-holder turning around. This clamping-eyebolt L being provided, as it is, with a rectangular opening and extended portion passing through an opening in the side of the machine at E, together with a nut N, permits the shank V and its surrounding insulating-sleeve V' to be held firmly or securely against the edges of the two internally-projecting ribs M M' in such manner as to permit of the vertical adjustment of the parts in a plane parallel with the diameter of commutation on the commutators, as will be clearly appreciable on inspection of Figs. 6 and 7 of the drawings.

I do not limit my improvements to the particular details of construction herein shown and described, as it is obvious that a number of such details may be applied to motors other than those having laminated body portions—as, for instance, the commutator-holding devices—and also the field-coil holders might be applied with well-known forms of dynamo-electric machines, in connection with which said parts might be used, and my claims are directed to the use of such individual elements in connection with all types of machines wherein they may be generally utilized.

Having thus described my invention, what I claim, and desire to secure by Letters Patent of the United States, is—

1. A field-coil holder for dynamo-electric machines, consisting of a wedge-shaped polar extension between the coil and its core, substantially as described.

2. A field-coil holder for dynamo-electric machines, consisting of a wedge-shaped polar extension provided with a groove or catch at its outer end which will engage an equivalent catch upon the pole-piece, substantially as described.

3. Wedge-shaped polar extensions of high magnetic reluctance extending along the sides of the field-cores for the purpose of holding the field-coil in position and also for reducing the magnetic flux at the pole-corners, substantially as described.

4. A clamp for a brush-holder consisting of an eyebolt and an insulating-sleeve adapted to be held by said eyebolt between two stationary ribs, substantially as described.

5. A brush-holder having a metal supporting-shank surrounded by a substantially square insulating-sleeve and clamped in a holder which permits the shank to be adjusted in a plane parallel with the diameter of commutation on the commutators.

In testimony whereof I have hereunto subscribed my name this 17th day of January, 1899.

ROBERT LUNDELL.

Witnesses:
   C. J. KINTNER,
   M. F. KEATING.